(12) United States Patent
Pitts

(10) Patent No.: US 6,847,968 B2
(45) Date of Patent: Jan. 25, 2005

(54) METHOD FOR FACILITATING ACCESS TO REMOTE FILES

(76) Inventor: William M. Pitts, 780 Mora Dr., Los Altos, CA (US) 94024

(*) Notice: Subject to any disclaimer, the term of this patent is extended or adjusted under 35 U.S.C. 154(b) by 0 days.

(21) Appl. No.: 10/466,968

(22) PCT Filed: Feb. 8, 2002

(86) PCT No.: PCT/US02/03617
§ 371 (c)(1),
(2), (4) Date: Jul. 21, 2003

(87) PCT Pub. No.: WO02/065342
PCT Pub. Date: Aug. 22, 2002

(65) Prior Publication Data
US 2004/0054681 A1 Mar. 18, 2004

(51) Int. Cl.[7] .............................................. G06F 17/30
(52) U.S. Cl. ......................... 707/10; 707/9; 709/217
(58) Field of Search ............................. 707/1, 2, 9, 10, 707/100, 101, 104.1; 709/213, 216, 217, 218, 219; 711/117, 118

(56) References Cited

U.S. PATENT DOCUMENTS 5,701,462 A * 12/1997 Whitney et al. ............... 707/10
5,802,297 A * 9/1998 Engquist ....................... 709/212

OTHER PUBLICATIONS

Tschammer et al, "On the co-operative management of domains in open distributed systems", IEEE 1993, pp. 47–53.*

* cited by examiner

*Primary Examiner*—Uyen Le
(74) *Attorney, Agent, or Firm*—Donald E. Schreiber

(57) ABSTRACT

A method for facilitating access to a file in a networked multiprocessor computer system including establishing a hierarchical distributed data service (DDS) domain tree (200) that encompasses all computers in the network, grafting onto the tree the file system trees (198) that are exported from one or more Network Distributed Caches (NDC) (50). An arbitrarily chosen name assigned to each DDS domain (206) respectively identifies roots (208) of the hierarchical DDS domain tree (200) and of each of the DDS sub-domain trees (202).

5 Claims, 6 Drawing Sheets

METHOD FOR FACILITATING ACCESS TO REMOTE FILES

TECHNICAL FIELD

The present invention relates generally to the technical field of distributed file systems technology, and, more particularly, to facilitating one networked digital computer's access to a file that is stored at another networked digital computer.

BACKGROUND ART

U.S. Pat. Nos. 5,611,049, 5,892,914, 6,026,452, 6,085,234 and 6,205,475 disclose methods and devices used in a networked, multi-processor digital computer system for caching images of files at various computers within the system. All five (5) United States patents are hereby incorporated by reference as though fully set forth here.

FIG. 1 is a block diagram depicting such a networked, multi-processor digital computer system that is referred to by the general reference character 20. The digital computer system 20 includes a Network Distributed Cache ("NDC") server site 22, an NDC client site 24, and a plurality of intermediate NDC sites 26A and 26B. Each of the NDC sites 22, 24, 26A and 26B in the digital computer system 20 includes a processor and RAM, neither of which are illustrated in FIG. 1. Furthermore, the NDC server site 22 includes a disk drive 32 for storing data that may be accessed by the NDC client site 24. The NDC client site 24 and the intermediate NDC site 26B both include their own respective hard disks 34 and 36. A client workstation 42 communicates with the NDC client site 24 via an Ethernet, 10BaseT or other type of Local Area Network ("LAN") 44 in accordance with a network protocol such as a Server Message Block ("SMB"), Network File System ("NFS®"), Hyper-Text Transfer Protocol ("HTTP"), Netware Core Protocol ("NCP"), or other network-file-services protocol.

Each of the NDC sites 22, 24, 26A and 26B in the networked digital computer system 20 includes an NDC 50 depicted in an enlarged illustration adjacent to intermediate NDC site 26A. The NDCS 50 in each of the NDC sites 22, 24, 26A and 26B include a set of computer programs and a data cache located in the RAM of the NDC sites 22, 24, 26A and 26B. The NDCs 50 together with Data Transfer Protocol ("DTP") messages 52, illustrated in FIG. 1 by the lines joining pairs of NDCs 50, provide a data communication network by which the client workstation 42 may access data on the disk drive 32 via the chain of NDC sites 24, 26B, 26A or 22NDC sites 24, 26B, 26A and 22.

The NDCs 50 operate on a data structure called a "dataset." Datasets are named sequences of bytes of data that are addressed by:

a server-id that identifies the NDC server site where source data is located, such as NDC server site 22; and a dataset-id that identifies a particular item of source data stored at that site, usually on a hard disk, such as the disk drive 32 of the NDC server site 22.

Topology of an NDC Network

An NDC network, such as that illustrated in FIG. 1 having NDC sites 22, 24, 26A and 26B, includes:

1. all nodes in a network of processors that are configured to participate as NDC sites; and
2. the DTP messages 52 that bind together NDC sites, such as NDC sites 22, 24, 26A and 26B.

Any node in a network of processors that possesses a megabyte or more of surplus RAM may be configured as an NDC site. NDC sites communicate with each other via the DTP messages 52 in a manner that is completely compatible with non-NDC sites.

FIG. 1 depicts a series of NDC sites 22, 24, 26A and 26B linked together by the DTP messages 52 that form a chain connecting the client workstation 42 to the NDC server site 22. The NDC chain may be analogized to an electrical transmission line. The transmission line of the NDC chain is terminated at both ends, i.e., by the NDC server site 22 and by the NDC client site 24. Thus, the NDC server site 22 may be referred to as an NDC server terminator site for the NDC chain, and the NDC client site 24 may be referred to as an NDC client terminator site for the NDC chain. An NDC server terminator site 22 will always be the node in the network of processors that "owns" the source data structure. The other end of the NDC chain, the NDC client terminator site 24, is the NDC site that receives requests from the client workstation 42 to access data on the NDC server site 22.

Data being written to the disk drive 32 at the NDC server site 22 by the client workstation 42 flows in a "downstream" direction indicated by a downstream arrow 54. Data being loaded by the client workstation 42 from the disk drive 32 at the NDC server site 22 is pumped "upstream" through the NDC chain in the direction indicated by an upstream arrow 56 until it reaches the NDC client site 24. When data reaches the NDC client site 24, it together with metadata is reformatted into a reply message in accordance with the appropriate network protocol such as NFS, and sent back to the client workstation 42. NDC sites are frequently referred to as being either upstream or downstream of another NDC site. If consistent images of files are to be projected from NDCs 50 operating as server terminators to other NDCs 50 throughout the digital computer system 20, the downstream NDC site 22, 26A or 26B must be aware of the types of activities being performed at its upstream NDC sites 26A, 26B or 24 at all times.

As described in the patents identified above, for the networked digital computer system 20 depicted in FIG. 1, a single request by the client workstation 42 to read data stored on the disk drive 32 is serviced as follows.

1. The request flows across the LAN 44 to the NDC client terminator site 24 which serves as a gateway to the chain of NDC sites 24, 26B, 26A and 22. Within the NDC client terminator site 24, NDC client intercept routines 102, illustrated in greater detail in FIG. 2, inspect the request. If the request is an NFS request and if the request is directed at any NDC sites 24, 26B, 26A or 22 for which the NDC client terminator site 24 is a gate-way, then the request is intercepted by the NDC client intercept routines 102.
2. The NDC client intercept routines 102 converts the NFS request into a DTP request, and then submits the request to an NDC core 106.
3. The NDC core 106 in the NDC client terminator site 24 receives the request and checks its NDC cache to determine if the requested data is already present there. If all data is present in the NDC cache of the NDC client terminator site 24, the NDC 50 will copy pointers to the data into a reply message structure and immediately respond to the calling NDC client intercept routines 102.
4. If all the requested data isn't present in the NDC cache of the NDC client terminator site 24, then the NDC 50 of the NDC client terminator site 24 accesses elsewhere any missing data. If the NDC client terminator site 24 were a server terminator site, then the NDC 50 would access the file system for the hard disk 34 upon which the data would reside.

5. Since the NDC client site 24 is a client terminator site rather than a server terminator site, the NDC 50 must request the data it needs from the next downstream NDC site, i.e., intermediate NDC site 26B in the example depicted in FIG. 1. Under this circumstance, DTP client interface routines 108, illustrated in FIG. 2, are invoked to request from the intermediate NDC site 26B whatever additional data the NDC client terminator site 24 needs to respond to the current request.

6. A DTP server interface routines 104, illustrated in FIG. 2, at the downstream intermediate NDC site 26B receives the request from the NDC 50 of the NDC client terminator site 24 and processes it according to steps 3, 4, and 5 above. The preceding sequence repeats for each of the NDC sites 24, 26B, 26A and 22 in the NDC chain until the request reaches the server terminator, i.e., NDC server site 22 in the example depicted in FIG. 1, or until the request reaches an intermediate NDC site that has cached all the data that is being requested.

7. When the NDC server terminator site 22 receives the request, its NDC 50 accesses the source data structure. If the source data structure resides on a hard disk, the appropriate file system code (UFS, DOS, etc.) is invoked to retrieve the data from the disk drive 32.

8. When the file system code on the NDC server terminator site 22 returns the data from the disk drive 32, a response chain begins whereby each downstream site successively responds upstream to its client, e.g. NDC server terminator site 22 responds to the request from intermediate NDC site 26A, intermediate NDC site 26A responds to the request from intermediate NDC site 26B, etc.

9. Eventually, the response percolates up through the sites 22, 26A, and 26B to the NDC client terminator site 24.

10. The NDC 50 on the NDC client terminator site 24 returns to the calling NDC client intercept routines 102, which then packages the returned data and metadata into an appropriate network protocol format, such as that for an NFS reply, and sends the data and metadata back to the client workstation 42.

The NDC 50

As depicted in FIG. 2, the NDC 50 includes five major components:

NDC client intercept routines 102;

DTP server interface routines 104;

NDC core 106;

DTP client interface routines 108; and file system interface routines 112.

Routines included in the NDC core 106 implement the function of the NDC 50. The other routines 102, 104, 108 and 112 supply data to and/or receive data from the NDC core 106. FIG. 2 illustrates that the NDC client intercept routines 102 are needed only at NDCs 50 which may receive requests for data in a protocol other than DTP, e.g., a request in NFS protocol, SMB protocol, or another protocol. The NDC client intercept routines 102 are completely responsible for all conversions necessary to interface a projected dataset image to a request that has been submitted via any of the industry standard protocols supported at the NDC sites 24, 26B, 26A or 22.

The file system interface routines 112 are necessary in the NDC 50 only at NDC file server sites, such as the NDC server terminator site 22. The file system interface routines 112 route data between the disk drives 32A, 32B and 32C illustrated in FIG. 2 and a data conduit provided by the NDCs 50 that extends from the NDC server terminator site 22 to the NDC client terminator site 24.

If the NDC client intercept routines 102 of the NDC 50 receives a request to access data from a client, such as the client workstation 42, it prepares a DTP request indicated by an arrow 122 in FIG. 2. If the DTP server interface routines 104 of the NDC 50 receives a request from an upstream NDC 50, it prepares a DTP request indicated by the arrow 124 in FIG. 2. The DTP requests 122 and 124 are presented to the NDC core 106. Within the NDC core 106, the requests 122 or 124 cause a buffer search routine 126 to search a pool 128 of NDC buffers 129, as indicated by the arrow 130 in FIG. 2, to determine if all the data requested by either the routines 102 or 104 is present in the NDC buffers 129 of this NDC 50. If all the requested data is present in the NDC buffers 129, the buffer search routine 126 prepares a DTP response, indicated by the arrow 132 in FIG. 2, that responds to the requests 122 or 124, and the NDC core 106 appropriately returns the DTP response 132, containing both data and metadata, either to the NDC client intercept routines 102 or to the DTP server interface routines 104 depending upon which routine 102 or 104 submitted the requests 122 or 124. If the NDC client intercept routines 102 receives DTP response 132, before the NDC client intercept routines 102 returns the requested data and metadata to the client workstation 42 it reformats the response from DTP to the protocol in which the client workstation 42 requested access to the dataset, e.g. into NFS, SMB, Netware or any other protocol.

If all the requested data is not present in the NDC buffers 129, then the buffer search routine 126 prepares a DTP downstream request, indicated by the arrow 142 in FIG. 2, for only that data which is not present in the NDC buffers 129. A request director routine 144 then directs the DTP request 142 to the DTP client interface routines 108, if this NDC 50 is not located in the NDC server terminator site 22, or to the file system interface routines 112, if this NDC 50 is located in the NDC server terminator site 22. After the DTP client interface routines 108 obtains the requested data together with its metadata from a downstream NDC site 22, 26A, etc. or the file system interface routines 112 obtains the data from the file system of this NDC client terminator site 24, the data is stored into the NDC buffers 129 and the buffer search routine 126 returns the data and metadata either to the NDC client intercept routines 102 or to the DTP server interface routines 104 as described above.

In addition to projecting images of a stored dataset, the NDCs 50 detect a condition for a dataset, called a concurrent write sharing ("CWS") condition, whenever two or more client sites concurrently access a dataset, and one or more of the client sites attempts to write the dataset. If a CWS condition occurs, one of the NDC sites, such as the NDC sites 22, 24, 26A and 26B in the digital computer system 20, declares itself to be a consistency control site ("CCS") for the dataset, and imposes restrictions on the operation of other NDCs 50 upstream from the CCS. The operating restrictions that the CCS imposes upon upstream NDCs 50 guarantee throughout the network of digital computers that client sites, such as the client workstation 42, have the same level of file consistency as they would have if all the client sites operated on the same computer. That is, the operating conditions that the CCS imposes ensure that modifications made to a dataset by one client site are reflected in the subsequent images of that dataset projected to other client sites no matter how far the client site modifying the dataset is from the client site that subsequently requests to access the dataset.

While the United States patents identified above disclose how images of files may be cached at various computers within the system in the digital computer system 20 and how operation of NDCs 50 preserve consistent images of the files throughout the digital computer system 20, the disclosures of those patents omits any discussion of problems which arise in managing assess to files stored at various locations throughout the digital computer system 20.

DISCLOSURE OF INVENTION

An object of the present invention is to facilitate access by networked computers to images of files stored at other digital computers included in the same network.

Another object of the present invention is to present networked digital computers with a hierarchical view of files that may be accessed via the network.

Another object of the present invention is to automatically assemble geographically distributed, hierarchical virtual file servers which permit easy access to and management of files stored at disparate locations.

Yet another object of the present invention is to permit secure distribution of images of files among networked digital computers and to maintain consistency between files and their projected images.

Yet another object of the present invention is to authenticate both users and systems which access files via a digital computer network.

Yet another object of the present invention is to impose access mode controls on the use of files, e.g. read-only or read/write, accessed via a digital computer network.

Yet another object of the present invention is to monitor and control file access via a digital computer network with respect to connection management, content management, presentation management, and access logging.

Briefly, the present invention is a method for facilitating access by a first digital computer to a file that is stored in a local file system tree of a second digital computer. Both the first and the second digital computers are included in a network of digital computers. Furthermore, the first digital computer is adapted for retrieving from the second digital computer and for storing a cached image of the file.

The method for facilitating access to the file includes the step of initially establishing a hierarchical domain tree that encompasses digital computers in the network of digital computers including the second digital computer. The digital computers in the network of digital computers begin establishing the hierarchical domain tree by exporting at least a root for the domain tree from which the digital computer exports files. Furthermore, digital computers in the network of digital computers that have been previously designated as domain managers for a group of digital computers in the network of digital computers begin establishing the hierarchical domain tree by:

1. receiving exported roots for domain trees; and
2. grafting onto a domain root of the domain manager the exported roots received from digital computers that have been assigned to the domain manager.

After the digital computers in the network of digital computers have established the hierarchical domain tree, the first digital computer accesses the file that is stored in a file system tree of the second digital computer by first retrieving from the domain manager the domain root for the hierarchical domain tree.

In another aspect the present invention includes a further method which permits domain managers for the second digital computer to enforce file access policies established by the second digital computer. In this further method a request by the first digital computer for access to the file stored at the second digital computer must traverse a domain manager for the second digital computer before arriving at the second digital computer. Furthermore, in this further method the domain manager that the request from the first digital computer for access to the file at the second digital computer must traverse has received from the second digital computer policy data specifying how access to files stored in the domain tree of the second digital computer is to be administered. Thus, when the domain manager for the second digital computer receives the request from the first digital computer for access to the file stored in the file system tree of the second digital computer, the domain manager forwards the request onto the second digital computer only if the policy data received by the domain manager permits access by the first digital computer to the file stored at the second digital computer.

These and other features, objects and advantages will be understood or apparent to those of ordinary skill in the art from the following detailed description of the preferred embodiment as illustrated in the various drawing figures.

BEST MODE FOR CARRYING OUT THE INVENTION

Figure 1:
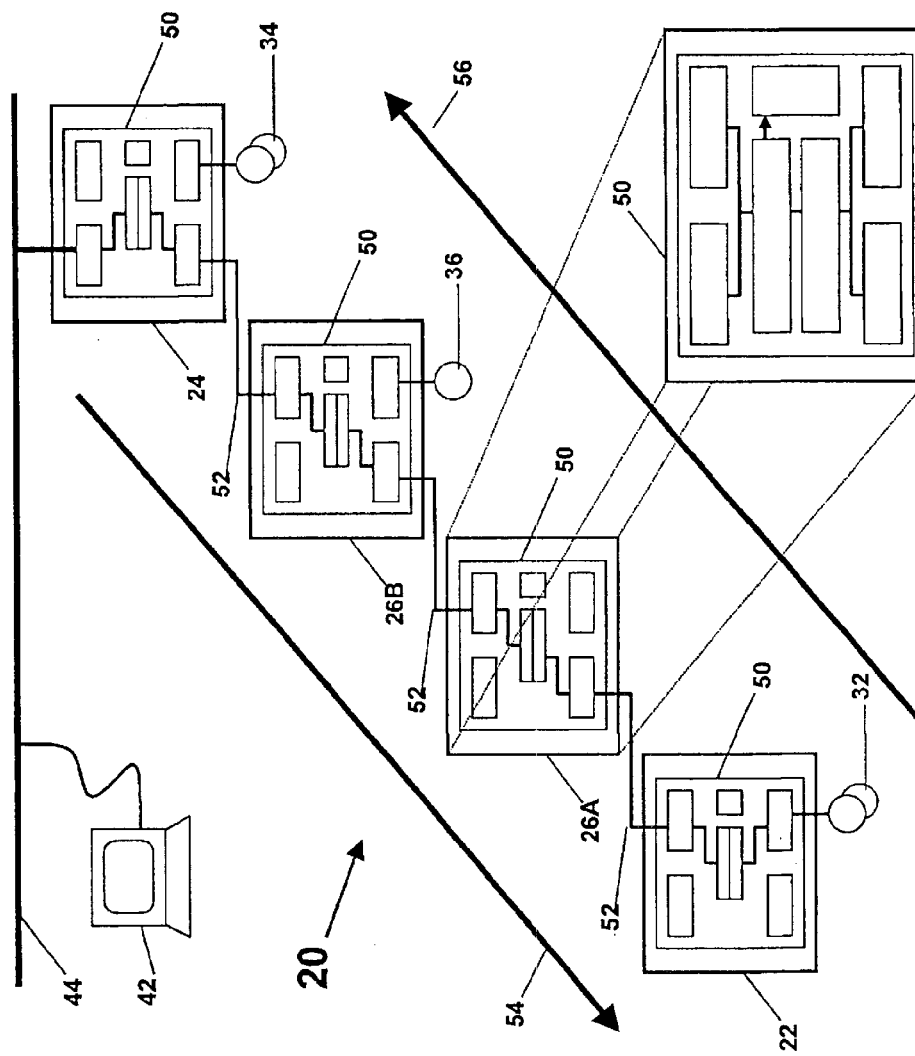
FIG. 1 is a block diagram illustrating a prior art networked, multi-processor digital computer system that includes an NDC server terminator site, an NDC client terminator site, and a plurality of intermediate NDC sites, each NDC site in the networked computer system operating to permit the NDC client terminator site to access data stored at the NDC server terminator site.
Figure 2:
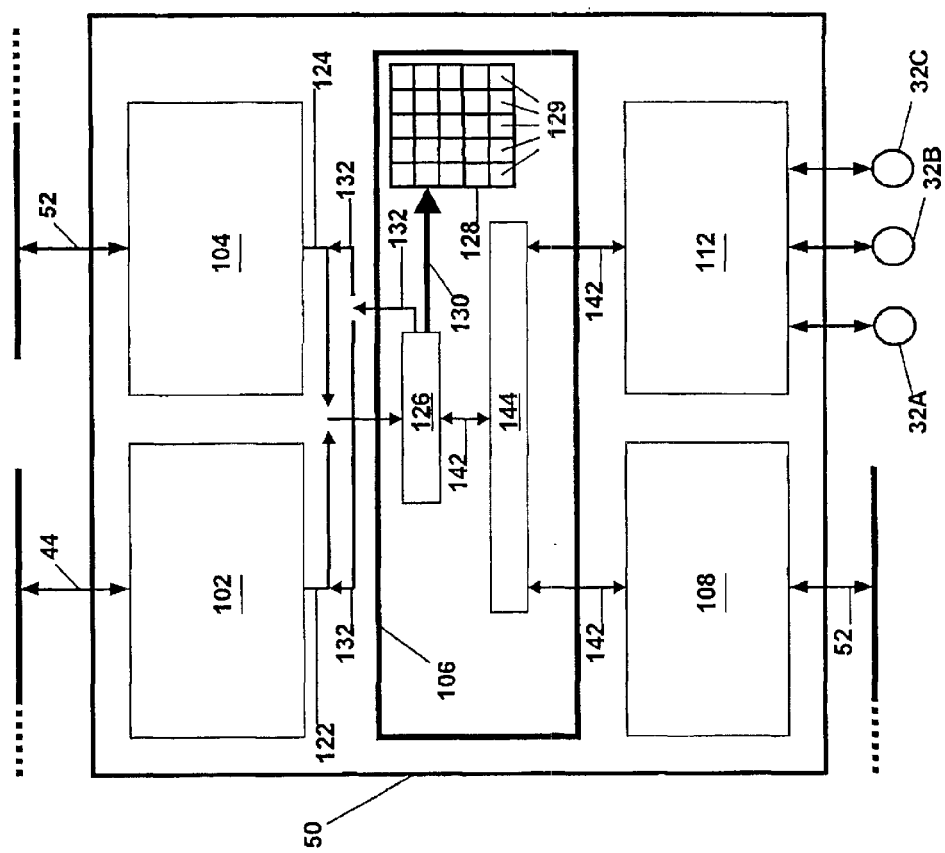
FIG. 2 is a block diagram illustrating a structure of the prior art NDC included in each NDC site of FIG. 1 including the NDC's buffers.

The structure and operation of the NDCs 50 depicted in FIGS. 1 and 2, and described in the patents identified above, can be advantageously exploited to establish a unified name space for accessing local file systems present respectively at each NDC site, such as the NDC sites 22, 24, 26A and 26B illustrated in FIG. 1. To other NDCs 50 included in the digital computer system 20, NDCs 50 which operate as server terminator sites can be viewed as exporting one or more file system trees 198 illustrated in FIG. 3. At each NDC 50, the exported file system trees 198 usually omit the true root of the local file system. By not exporting the true root of the local file system tree, each NDC 50 preserves one or more spaces on one or more disk drives 32 where may be stored vital system files that are essential to maintaining the integrity and security of exported files.

Figure 3:
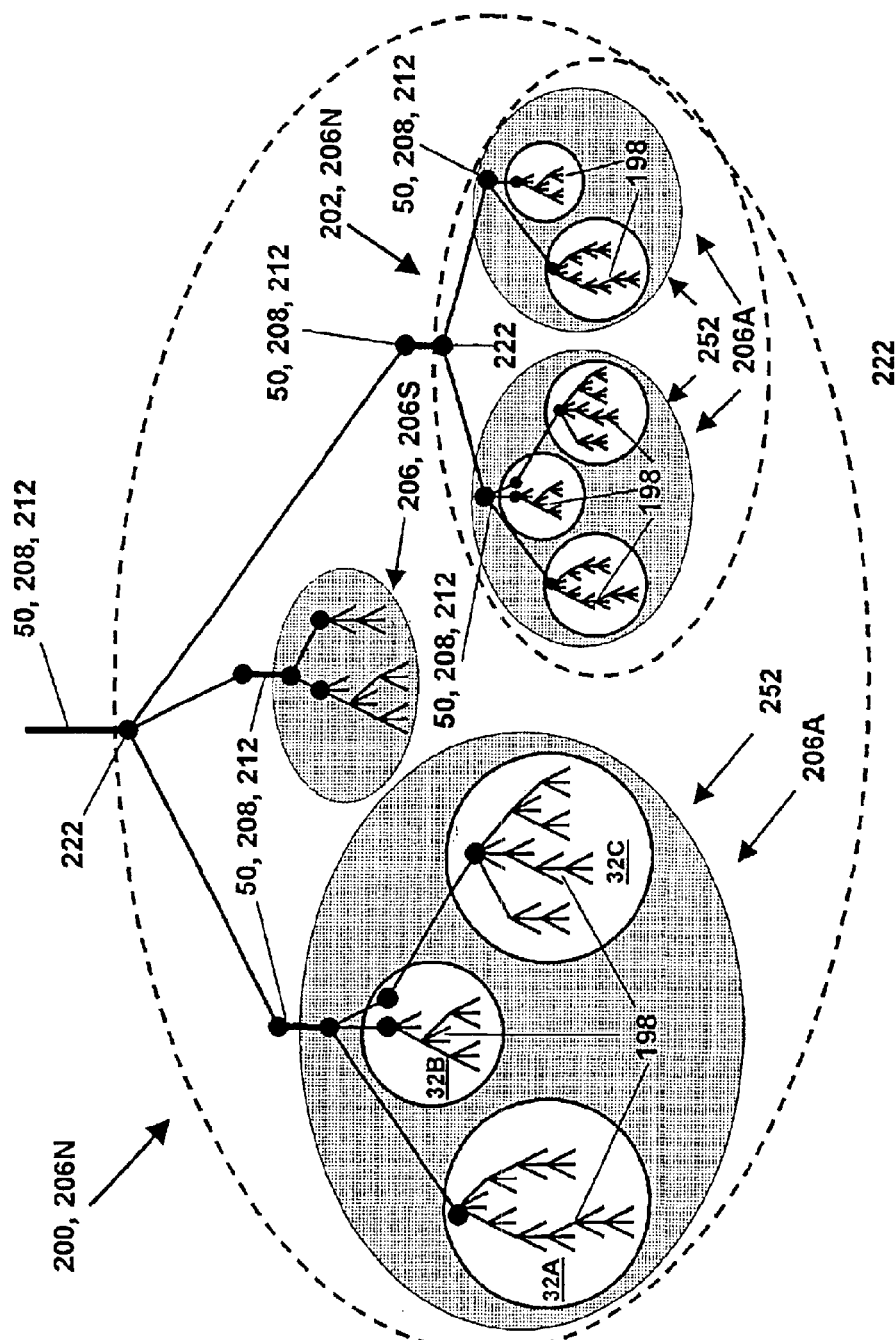
FIG. 3 is a tree diagram illustrating several hierarchical domain trees in accordance with the present invention.

The unified name space that may be created includes one or more hierarchically organized domains that are assembled by grafting onto a single, hierarchical Distributed Data Service ("DDS") domain tree, indicated in FIG. 3 by the general reference character 200, the hierarchical file system trees 198 that are exported from one or more NDCs 50. The overall DDS domain tree 200 may include one or more DDS sub-domain trees 202 that are enclosed within dashed ovals in FIG. 3. An arbitrarily chosen name, that is assigned to each DDS domain 206, respectively identifies roots 208 of the hierarchical DDS domain tree 200 and of each of the DDS sub-domain trees 202. In most respects, each DDS domain 206 and that domain's hierarchical DDS domain tree. 200 or DDS sub-domain tree 202 are synonymous.

Each DDS domain 206 constitutes a named set of digital computing resources that are organized into the hierarchical DDS domain tree 200 or DDS sub-domain tree 202. Digital computing resources of the DDS domain 206 may be considered to be analogous to branches and leaves on a tree. Similar to a tree, each DDS domain, 206 may have many branches and leaves, while always having but a single root 208. The hierarchical DDS domain tree 200 and DDS sub-domain trees 202 incorporate all local file system trees 198 that are exported from all NDC sites, such as the NDC sites 22, 24, 26A and 26B illustrated in FIG. 1, that are included in each respective DDS domain 206.

Figure 4:
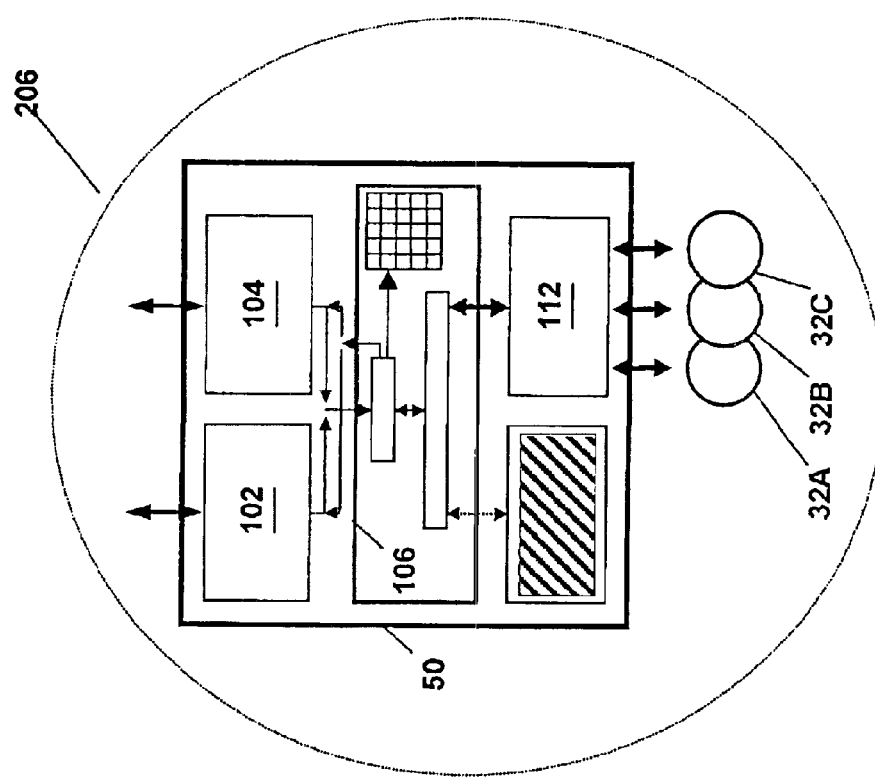
FIG. 4 is a block diagram of an NDC that constitutes an atomic domain.
Figure 5:
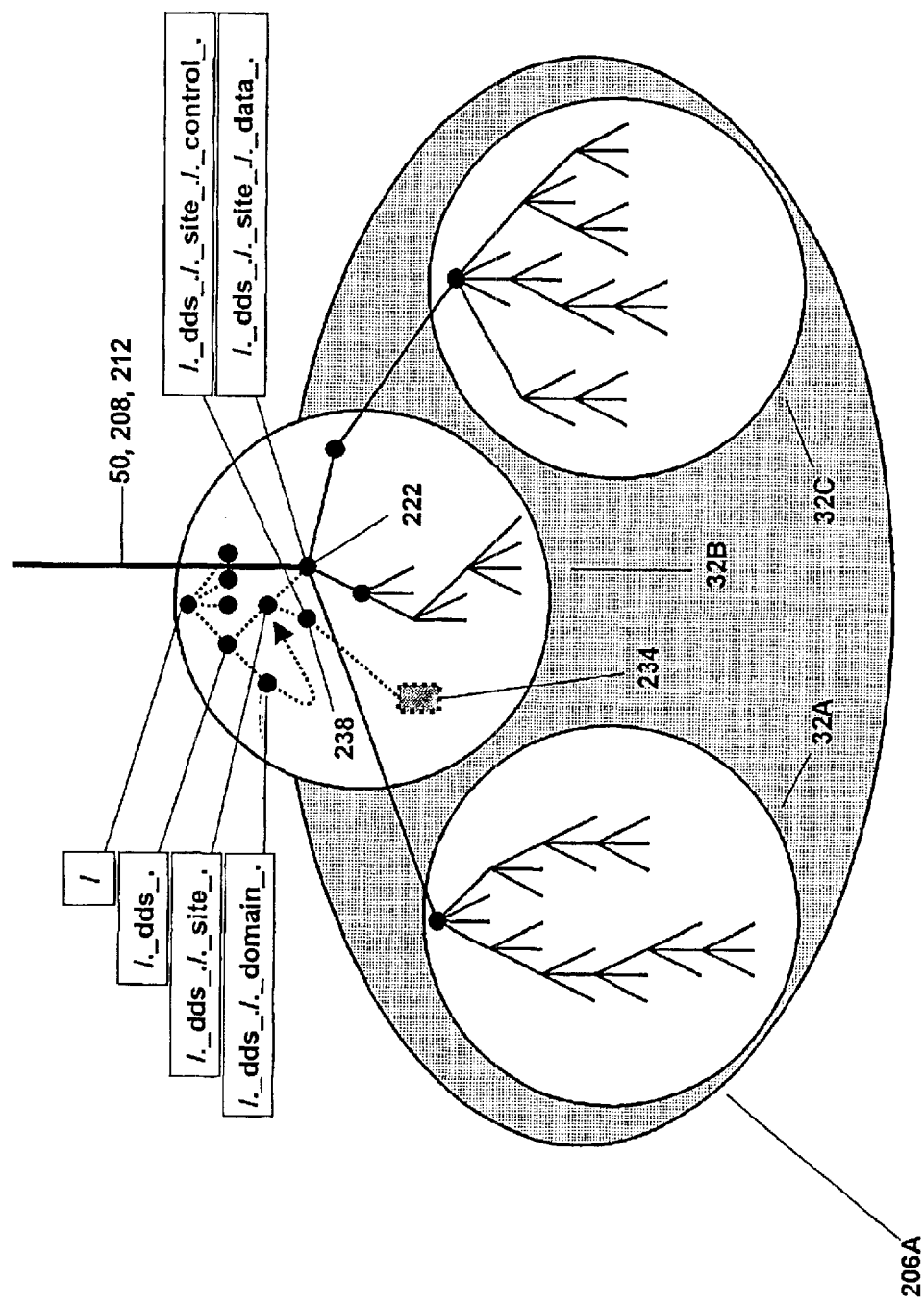
FIG. 5 is a tree diagram illustrating a domain tree exported by an atomic domain together with several directories and a symbolic link that are used in assembling the atomic domain's name space.

As used herein, an atomic DDS domain 206A, illustrated in greater detail in FIGS. 4 and 5, consists of one NDC 50 together with local physical or logical disk drives 32A, 32B and 32C, and one or more file systems that record files onto and retrieve files from the disk drives 32A, 32B and 32C. As explained in greater detail below, each atomic DDS domain 206A exports to an NDC 50 that has been designated as a domain manager 212 only a single root 208 upon which have been grafted the exported portion of local file system trees 198. One characteristic unique to atomic DDS domains 206A is that they provide access via the DDS domain tree 200 to only files stored in their local file system trees 198. That is, all communication with files exported from the NDC 50 pass through the file system interface routines 112 illustrated in FIG. 2, and the DTP client interface routines 108 are never used.

Atomic DDS domains 206A permit no further discrimination at the domain level, and the NDC 50 at atomic DDS domains 206A performs only a portion of the functions of a domain manager 212 at non-atomic DDS domains 206N. However, any number of different and independent atomic DDS domains 206A at different NDCs 50 may export the same DDS sub-domain tree 202 in parallel with each other. In this way an arbitrary number of atomic DDS domains 206A may operate collaboratively in parallel to advantageously increase scalability and/or availability of the DDS sub-domain tree 202 exported by such atomic DDS domains 206A.

During assembly of the DDS sub-domain trees 202 and ultimately the DDS domain tree 200, each DDS sub-domain 206S exports the root 208 of its portion of the DDS domain tree 200 using the name that identifies the DDS sub-domain 206S. In each DDS sub-domain 206S, the unexported portion of the local file system tree 198 includes a directory 222, best illustrated in FIG. 5 by an enlarged dot, that is preferably named /.__dds__./.__site__./.__data__.

During initialization, DDS creates the directory 222 which provides the root 208 for a DDS site tree 252 exported by the DDS sub-domain 206S. Sub-directories of the directory 222 (or possibly symbolic links) are created as required to provide contiguous name space linkage to the portion of the local file system trees 198 exported from each DDS domain 206. When the NDC 50 of DDS domains 206 receives a DDS_CONNECT DTP message 52 with a public file handle parameter of DDS_FH_DOMAIN_ROOT, the NDC 50 connects to a directory 232 in the unexported portion of the local file system tree 198 preferably named /.__dds__./.__domain__./.__data__.

The /.__dds__./.__domain__./.__data__. directory 232 is the root 208 of the DDS sub-domain tree 202 exported from the DDS domain 206. The directory 232 holds a simlink to any local directory 222, and also directories 228 to which roots 208 of any DDS sub-domains 206S are grafted.

Constructing a Domain Tree

The simplest possible hierarchical DDS domain 206N, illustrated by the DDS sub-domain tree 202 located along the right hand side of the FIG. 3, consists of at least two atomic DDS domains 206A together with a single domain manager 212. DDS creates each DDS domain tree 200 and DDS sub-domain tree 202 as follows.

Figure 6:
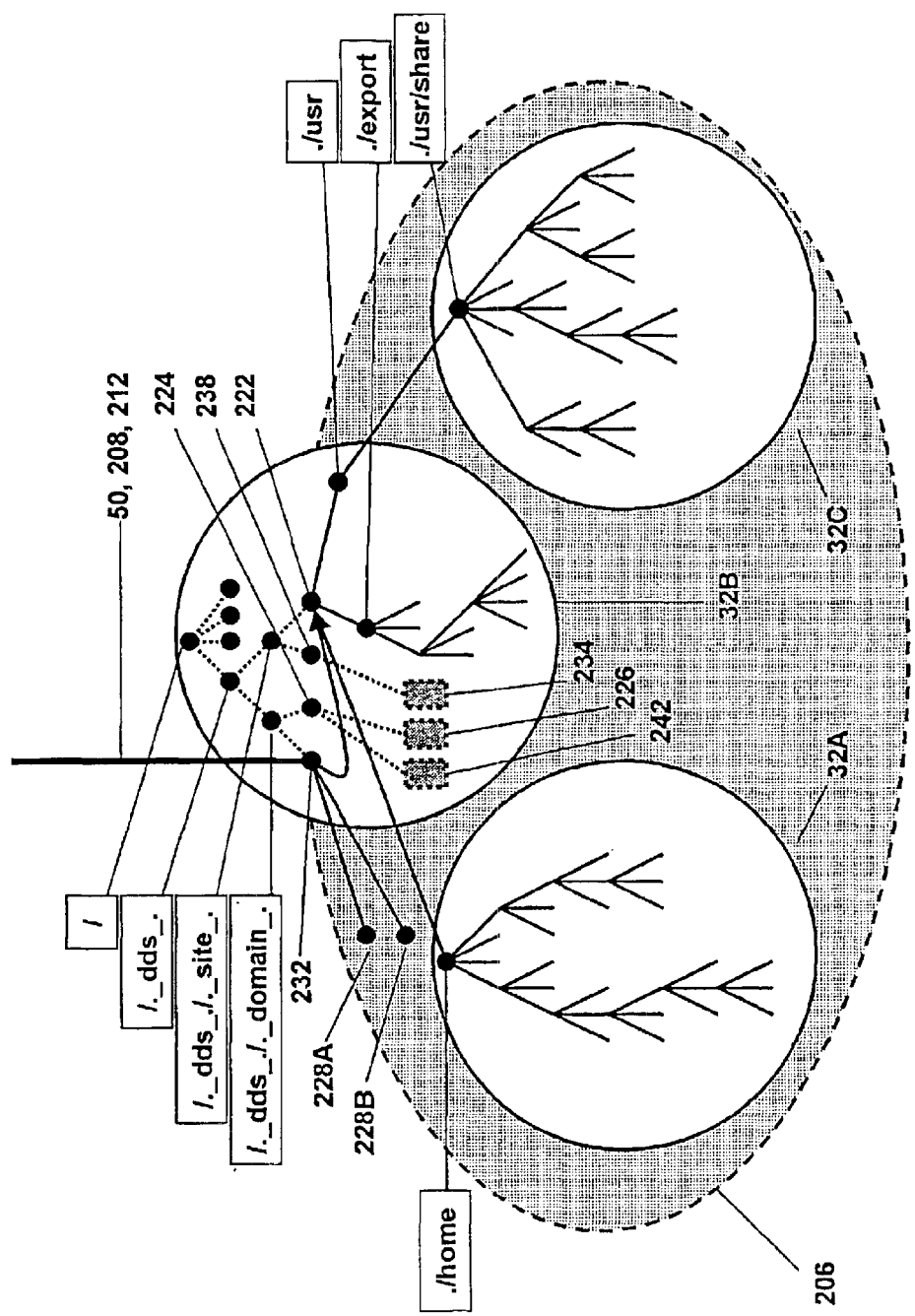
FIG. 6 is a tree diagram illustrating a domain tree exported by a domain manager of a non-atomic domain together with several directories and a symbolic link that are used in assembling the name space for the domain.

1. During initialization, each NDC 50 which exports a local file system tree 198, and can therefore be a NDC server terminator site 22:
   a. first creates the /.__dds__./.__site__/.__data__. directory 222 in an unexported portion of the local file system tree 198; and
   b. then creates sub-directories and symbolic links as required to provide contiguous name space linkage to the root of each exported portion of each file system tree 198 exported from the DDS domain 206;
2. each NDC 50, which has been designated as the domain manager 212 by having in an unexported portion of the local file system tree 198 a directory 224, illustrated by an enlarged dot, that is preferably named /.__dds__./.__domain__./.__control__.

that stores a file 226 preferably named .__domain_map__. that is illustrated in FIG. 6:
   a. creates in the unexported portion of the local file system tree 198 the directory 232, illustrated by an enlarged dot in FIG. 5, that is preferably named /.__dds__./.__domain__./.__data__.

that has sub-directories and symbolic links as required to provide contiguous name space linkage to the DDS sub-domain trees 202 for which it is the domain manager 212; and
   b. sequentially processes a list of member names of DDS sub-domains 206S read from the .__domain_map__. file 226 by:
      i. creating a subdirectory in the /.__dds__./.__domain__./.__data__. directory 232 for each domain member name read from the .__domain_map__. file 226;
      ii. if the .__domain_map__. file 226 also specifies a logical name in addition to the physical name assigned to the member DDS domain 206, creating a symbolic link with the logical name in the /.dds__./.__domain__./.data__. directory 232 that points to the sub-directory that was just created with the domain member's physical name;
      iii. interrogating Domain Name System ("DNS"), or an alternative name service such as Windows Internet Name Service ("WINS") or Network Information Service ("NIS"), for each member name read from the .\_domain\_map\_. file 226 and receiving from the DNS the Internet Protocol ("IP") address of the DDS sub-domain 206S;

iv. sending a DDS\_CONNECT DTP message 52 that has a public file handle parameter of DDS\_FH\_DOMAIN\_ROOT to each IP address provided by DNS thereby connecting to the root 208 of each DDS sub-domain 206S; and v. issuing additional DTP messages 52 to each DDS sub-domain 206S to retrieve images:
  (1) of the root directory of the DDS sub-domain tree 202; and
  (2) of a portal file of the DDS sub-domain 206S, if one exists: and 3. responsive to requests received from the domain manager 212, each DDS sub-domain 206S returns to the domain manager 212 images of:
  a. the root directory to the DDS sub-domain 206S; and
  b. the portal file of the DDS sub-domain 206S, if one exists.

Every NDC 50 that has been designated as a domain manager 212 performs step 2. above. If a named DDS sub-domain 206S fails to respond to the DDS\_CONNECT DTP message 52 having the public file parameter of DDS\_FH\_DOMAIN\_ROOT sent by a domain manager 212, perhaps because the digital computer hosting the NDC 50 is not operating or, if operating, is not yet in a state in which it can respond to the DDS\_CONNECT DTP message 52, the domain manager 212 periodically retransmits the DDS CONNECT DTP message 52 until the named atomic DDS domain 206A or DDS sub-domain 206S responds set forth in step 3. above. If several retransmission attempts fail to elicit a response from the named DDS sub-domain 206S, the domain manager 212 continues processing the .\_domain\_map\_. file 226 to construct the DDS domain tree 200. If a subsequent attempt by the domain manager 212 to communicate with a non-responding named DDS sub-domain 206S, perhaps attempting to fetch a file image that has been requested by the client workstation 42, fails, then the domain manager 212 sends an appropriate error message to the client workstation 42 indicating that the request cannot be satisfied at present. In this way, each domain manager 212 ultimately connects to all operating NDCs 50 of the DDS sub-domains 206S listed in the .\_domain\_map\_. file 226 to thereby ultimately construct the entire DDS domain tree 200 illustrated in FIG. 3. Every file stored anywhere within the DDS domain tree 200 which is exportable is uniquely identified by a pathname whose leading components are the names assigned to the various nested DDS domains 206 within which the file resides.

A summary of fields that are included in the .\_domain\_map\_. file 226 is set forth below.

DOMAIN domain name

MANAGERS names of the domain manager(s) 212 for this DDS domain 206

MEMBERS physical name(s) of DDS sub-domains 206S, each possibly followed by one or more logical names, for which this is the domain manager 212

While the DDS domain tree 200 is preferably assembled as described above, there exist alternative techniques by which domain managers 212 may establish connections to DDS sub-domains 206S. For example, instead of DDS sub-domains 206S exporting their respective roots 208 in response to the DDS\_CONNECT DTP message 52, during initialization DDS sub-domains 206S could export their respective names and IP addresses by advertising them to all NDCs 50 connected to a LAN, such as the LAN 44. Upon receiving the broadcast names and IP addresses, every NDC 50 that has been designated a domain manager 212 would, using data stored in its .\_domain\_map\_. file 226, determine whether it is the domain manager 212 for particular DDS sub-domains 206S, and if so, storing the name and IP address thereof appropriately into the /.\_dds\_./.\_domain\_./.\_data\_. directory 232 for the domain manager 212.

As described thus far, individual DDS sub-domains 206S may belong to the domains of an unlimited number of domain managers 212, i.e concurrently be members of several DDS domains 206. Arranging DDS domain trees 200 or DDS sub-domain trees 202 such that several domain managers 212 manage identical groups of DDS sub-domains 206S likely ensures that files may be reliably accessed through one of the domain managers 212 if another of the domain managers 212 were to fail.

Accessing the Domain Tree

To access a file stored within a DDS domain 206, a client such as the client workstation 42 causes a DDS\_CONNECT DTP message 52 that has a public file handle parameter of DDS\_FH\_DOMAIN\_ROOT to be issued to a domain manager 212. The domain manager 212 receiving the DDS\_CONNECT DTP message 52 with the public file handle parameter of DDS\_FH\_DOMAIN\_ROOT responds by establishing a connection to the root 208 of the DDS domain tree 200. After connecting to the root 208 of the DDS domain tree 200, the client workstation 42 may navigate throughout the DDS domain tree 200 using standard file system operations.

Portal Files

As described thus far, operation of DDS is trusting and promiscuous. That is, any client workstation 42 can access any file exported by any DDS domain 206. Moreover, any NDC 50 can, in principle, declare itself to be a domain manager 212 for any DDS domain 206. Such operation of DDS permits any client workstation 42 or NDC 50 to retrieve file images from anywhere in the DDS domain tree 200, and to modify the file. Maintaining integrity of files stored within the DDS domain tree 200 as described thus far is clearly a herculean task.

To facilitate managing files stored within the DDS domain tree 200, DDS provides a set of administrative controls of a type commonly available in current distributed file systems. These controls may include authentication both of users and of systems, access mode control, e.g. read-only or read/write, and encryption. However, as described in greater detail below, DDS can also be readily and easily adapted to provide additional types of administrative control and monitoring mechanisms, which include connection management, content management, presentation management, and access logging.

Administrative controls are preferably added to atomic DDS domains 206A by:

1. adding to each un-exported portion of the local file system tree 198 a directory 238, illustrated by an enlarged dot, that is preferably named /.\_dds\_.\_site\_./.\_control\_.; and
2. storing in the /.\_dds\_./.\_site\_./.\_control\_. directory 238 a site portal file 234.

A portal file, such as the site portal file 234, preferably includes the following sections.

Domain—the name of this DDS domain 206

Manager—the name(s) assigned to system(s) hosting NDC(s) 50 that provide the domain manager(s) 212 for this DDS domain 206

Referral—the IP address(es) of NDC(s) 50 that provide the domain manager(s) 212 for this DDS domain 206

Namespace—the name space to which this DDS domain 206 belongs

Registration—specifies where and/or how to register the root 208 of this DDS domain 206

Data Staging—Replicated File System, Scheduled Flushing, Arrested Write, . . .

Configuration—Mirror, RAID, Local Director, Global Director, . . .

Policy—the policies to be applied by the domain manager 212 for this DDS domain 206

Authentication—rules for granting access to files stored in the DDS domain tree 200 of this DDS domain 206

Encryption—provides security for files being transmitted upstream

Presentation—loadable modules required to view or manipulate the local DDS domain tree 200

Required Modules—the names of loadable modules that must be installed at upstream NDC client terminator sites 24 that attempt to access the DDS domain tree 200

Moreover, as described above, during initialization each domain manager 212 receives projected images of portal files from each DDS sub-domain 206S listed in the .\_domain\_map\_. file 226, if the portal files exist. The domain manager 212 combines data extracted from images of site portal files 234 projected from atomic DDS domains 206A and images of domain portal files 242 projected from non-atomic DDS sub-domains 206N with a domain portal file 242 for the domain manager 212 to compile a composite portal file which the domain manager 212 stores in the random access memory ("RAM") for the NDC 50. The composite portal file for each domain manager 212 provides a concise summary of all policies specified by all the domain portal files 242 that are present within the DDS domain 206. Accordingly, during construction of the DDS domain tree 200, domain managers 212 for DDS sub-domains 206S export their respective composite portal files to their respective domain managers 212 in response to a request therefor.

Industrial Applicability

The first constraint imposed by a portal file is that DDS domain 206 is no longer promiscuous. That is, a DDS domain 206 having a domain portal file 242 will connect only to NDCs 50 specifically identified as one of its domain managers 212 in the portal file. Moreover, the portal file for the DDS domain 206 and the .\_domain\_map\_. file 226 used by the domain manager 212 may designate passwords or other authentication data which must be exchanged and verified before a connection can be established between the DDS domain 206 and the domain manager 212. Thus, use of data stored in the portal file permits imposing constraints upon the organization of the DDS domain tree 200 despite the fact that all NDCs 50 included in the DDS domain tree 200 connect to the same LAN and can exchange messages and data arbitrarily among the NDCs 50 via the LAN.

As described previously, in assembling the DDS domain tree 200 and the various DDS sub-domain trees 202 the domain managers 212 request and receive images of the domain portal files 242 from the DDS sub-domains 206S and use them to compile the composite portal file. Moreover, the domain manager 212 can impose authentication and other policies immediately without DTP messages 52 actually reaching the addressed DDS domain 206. That is, if the authentication and policies of a particular atomic DDS domain 206A in the DDS domain tree 200 barred access to the atomic DDS domain 206A by a specified client workstation 42, and if during construction of the DDS domain tree 200 authentication and policy data from an image of the domain portal file 242 for that atomic DDS domain 206A were exported to the domain manager 212 for the DDS domain tree 200, then the NDC 50 for the DDS domain tree 200 could reject all DTP messages 52 from the client workstation 42 seeking access to the atomic DDS domain 206A.

Moreover, the file consistency provided by the NDCs 50 ensures that any change occurring in a domain portal file 242 or a composite portal file will automatically invalidate all images of that portal file at all NDCs 50 in the digital computer system 20. Consequently, if a change is made in the portal file at an atomic DDS domain 206A, then the NDC 50 for any domain manager 212 that has previously received a copy the domain portal file 242 will automatically be notified that a new, up-to-date copy of the domain portal file 242 must be retrieved. Correspondingly, each higher level domain manager 212 that has received either the now invalidated domain portal file 242, or a composite portal file which contained data extracted from the now invalidated domain portal file 242, invalidates their respective composite portal files thereby automatically notifying the next higher level domain manager 212 that a new, up-to-date copy of the composite portal file must be retrieved.

The policy enforcement mechanism provided by site portal files 234 and 242 may be further extended into individual directories of local file system trees 198. Thus, directories of file system trees 198 may include hidden files, preferably named .\_control\_., which contain only Policy, Authentication, Encryption, Presentation and Required Modules data similar to that stored in site portal files 234 and 242. The domain managers 212 use policy data from .\_control\_. files in regulating access to files in individual directories of local file system trees 198.

In this way, DDS provides domain centric, policy driven administrative control mechanisms which enable each DDS domain 206 to exercise complete control over its digital computing resources, not only locally at the NDC 50 for the DDS domain 206, but everywhere throughout the entire DDS domain tree 200.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A method for facilitating access by a first digital computer to a file that is stored in a local file system tree of a second digital computer, both the first and the second digital computers being included in a network of digital computers; the first digital computer being adapted for retrieving from the second digital computer and for storing a cached image of the file, the method comprising the steps of:

a) initially establishing a single, hierarchical domain tree that encompasses digital computers in the network of digital computers including the second digital computer by:

i) digital computers in the network of digital computers exporting at least a root of a domain tree that is used in exporting files from digital computers; and ii) digital computers in the network of digital computers that have been previously designated as domain managers for a group of digital computers in the network of digital computers:
1) receiving exported roots for domain trees; and
2) grafting onto a domain root of the domain manager the exported roots received from digital computers that belong to the group assigned to the domain manager; and b: the first digital computer retrieving from the domain manager the domain root for the hierarchical domain tree.

2. The method of claim 1 wherein individual digital computers export the root for the domain tree responsive to a request therefor.

3. The method of claim 1 wherein individual digital computer export the root for the domain tree by advertising the root to other digital computers included in the network of digital computers.

4. The method of claim 1:
wherein the network of digital computers includes at least a third digital computer that has been designated as the domain manager for a group of digital computers which includes a fourth digital computer that has also been designated as a domain manager; and
wherein during establishment of the hierarchical domain tree the fourth digital computer exports at least the domain root onto which the fourth digital computer grafts roots received from digital computers for which the fourth digital computer is the domain manager;

the method comprising the further steps of the third digital computer:
receiving the domain root exported by the fourth digital computer; and
grafting onto the domain root for the third digital computer the domain root exported by the fourth digital computer.

5. The method of claim 1:
wherein a request by the first digital computer for access to the file stored at the second digital computer must traverse a domain manager for the second digital computer before arriving at the second digital computer; and wherein the domain manager that the request from the first digital computer for access to the file at the second digital computer must traverse has received from the second digital computer policy data specifying how access to files stored in the local domain tree of the second digital computer is to be administered;

the method comprising the further step of the domain manager forwarding onto the second digital computer the request by the first digital computer for access to the file stored at the second digital computer only if the policy data received by the domain manager permits access by the first digital computer to the file stored at the second digital computer.

* * * * *